(12) United States Patent
Usui et al.

(10) Patent No.: US 7,243,596 B2
(45) Date of Patent: Jul. 17, 2007

(54) SPACER EXPANDER

(75) Inventors: Miyuki Usui, Niigata (JP); Nobuo Katayama, Niigata (JP); Masahiro Nakazawa, Niigata (JP)

(73) Assignee: Kabushiki Kaisha Rikon, Chiyoda-ku, Tokyo (JP)

( * ) Notice: Subject to any disclaimer, the term of this patent is extended or adjusted under 35 U.S.C. 154(b) by 0 days.

(21) Appl. No.: 11/358,186

(22) Filed: Feb. 21, 2006

(65) Prior Publication Data
US 2006/0169135 A1 Aug. 3, 2006

Related U.S. Application Data

(63) Continuation of application No. PCT/JP2004/011749, filed on Aug. 16, 2004.

(30) Foreign Application Priority Data
Aug. 21, 2003 (JP) ............................. 2003-297108

(51) Int. Cl.
*F16J 9/20* (2006.01)
(52) U.S. Cl. ..................... 92/253; 277/473; 277/477
(58) Field of Classification Search ................. 92/250, 92/253; 277/467, 470, 473, 474, 477
See application file for complete search history.

(56) References Cited

U.S. PATENT DOCUMENTS 4,759,266 A * 7/1988 Murray ...................... 92/257
5,052,698 A * 10/1991 Kimura ...................... 277/477

FOREIGN PATENT DOCUMENTS

| JP | 04-300467 | 10/1992 |
| JP | 05-087240 | 4/1993 |
| JP | 05-106734 | 4/1993 |
| JP | 06-081950 | 3/1994 |
| JP | 05-069289 A | 3/2005 |
| WO | WO 2005/019706 A1 | 3/2005 |

* cited by examiner

Primary Examiner—Michael Leslie
(74) Attorney, Agent, or Firm—Slater & Matsil, LLP.

(57) ABSTRACT

In a combined oil ring having a spacer expander to be installed between a pair of upper and lower side rails, a plurality of axially protruding inner peripheral protruding portions are formed on the inner peripheral side of the spacer expander along its peripheral direction. The inner peripheral protruding portions press the inner peripheral surface of the side rails. On the outer peripheral side of the spacer expander, a plurality of slits are formed, and a plurality of connecting portions are located in the peripheral direction isolated by the slits. On the plurality of connecting portions, axially protruding outer peripheral protruding portions are formed.

13 Claims, 4 Drawing Sheets

(a)

(b)

SPACER EXPANDER

This application is a continuation of PCT Application No. PCT/JP2004/11749, which was filed Aug. 16, 2004 and designated the United States, which claims priority to Japanese Patent Application No. 2003-297108, which was filed on Aug. 21, 2003, both of which are incorporated herein by reference.

TECHNICAL FIELD

This invention relates to a spacer expander of a three-piece type combined oil ring that is installed in a piston of an internal combustion engine and performs oil controlling.

BACKGROUND

A cross sectional configuration of general piston rings installed in a piston of an internal combustion engine is shown in FIG. 9. In a piston 100, ring grooves 110, 120, and 130 are formed for accommodating piston rings. In each ring groove, compression rings 200 and 210 are mainly for gas sealing, and a three-piece oil ring 220 is mainly for oil controlling and oil sealing are inserted respectively. In accordance with the reciprocating motion of the piston 100, outer peripheral sliding surfaces of these rings slide with the inner wall of a cylinder 300.

The three-piece type combined oil ring 220 comprises a pair of side rails 230 and 240 arranged at its axially upper and lower portions, and a spacer expander 250 combined therebetween for pressing the side rails 230 and 240 from inner peripheral side to produce tension on the side rails 230 and 240. Profiles of each of these components are described, for example, in JIS B 8032-13, "Internal combustion engines—Small diameter piston rings—Part 13: Expander/segment oil control rings," published on Mar. 31, 1999, pages 3 to 5.

Due to the ear portions 252 that are formed with an angle to protrude in the axial direction of the spacer expander 250, the side rails 230 and 240 are pressed with component forces in the radial direction toward the cylinder wall and in the axial direction toward upper or lower surface of the ring groove. Therefore, the side rails 230 and 240 can perform sealing with the cylinder wall and with the upper and lower surfaces of the ring groove 130.

The configuration of such a spacer expander of a combined oil ring is disclosed in JP06-081950A, for example. In this spacer expander, a wave shape is formed in the axial direction by gear machining of a metal strip. The outer peripheral surfaces of the side rails are pressed toward the inner peripheral surface of the cylinder with the tension generated by the wave-shaped portion, and thus secures sealing property. In addition, this wave-shaped portion becomes an inlet and outlet of oil, and effectively prevents sticking. Moreover, in the inner peripheral portion of the spacer expander, protruding portions in the axial direction of the piston (ear portions) are formed for pressing the side rails outward in the radial direction, and protruding portions are formed in the outer peripheral portion for supporting the side rails in the axial direction.

With the recent trend toward better fuel consumption of engines, it has been desired to reduce width and weight of oil rings. As an example of reducing width in the axial direction of a three-piece type combined oil ring, JP04-300467A is reported. The expander of this oil ring is made of a steel strip having a wave shape in the axial direction, in which an upper portion and a lower portion are alternately located and axially spaced apart in a circular arrangement and both portions are connected with an intermediate portion extending in the axial direction. The expander is not inserted between two rails. Tapered faces are formed on both upper and lower sides of the outer peripheral surface of the expander. Inner peripheral surfaces of the upper and lower rails are pushed by the tapered faces so that the rails contact with the inner peripheral surface of the cylinder. Because the expander is not inserted between the upper and lower rails, the width of the oil ring in the axial direction can be reduced.

In JP05-087240A, a spacer expander of a narrow width three-piece oil ring is reported. The spacer expander is made of a shape steel material having a substantially lateral T-shape in cross section. In this spacer expander, side rail supporting surfaces are formed on the top and bottom of an enlarged portion on outer peripheral side, and upper and lower pads for pushing side rails are formed by bending end surfaces on inner peripheral side alternately upward and downward. The pad portions are bent by plastic working, and have thin material thickness and a low stiffness. Thus, the pad portions have a high degree of flexibility in displacement. Therefore, an excellent followability can be obtained in pushing the side rails toward the inner peripheral surface of the cylinder due to the elasticity of the pad portions, and better sealing can be maintained even at low tension, compared to the conventional oil rings.

JP05-106734A discloses a spacer expander of a narrow width three-piece oil ring. Here, the spacer expander is made of a base plate of a shape steel material whose outer peripheral side is thick and inner peripheral side is thin. Slits are formed alternately from the inner peripheral side and the outer peripheral side. The outer peripheral side portion formed between the adjacent slits on the outer peripheral side and the inner peripheral side portion formed between the adjacent slits on the inner peripheral side are bent alternately upward and downward, and the surfaces facing the outer peripheral side support side rails. This spacer expander ensures that the side rails follow irregularities on the inner peripheral surface of the cylinder because the inner peripheral side portion has a low stiffness, and thus easily deforms elastically.

In a combined oil ring, as shown in JP06-081950A, the side rails are combined with the spacer expander so that the inner peripheral surfaces of the side rails contact with ear portions of the spacer expander. The combined width of the oil ring in the axial direction depends on the axial width of the connecting portion that connects the upper portion and the lower portion of the wave shape of the spacer expander. Therefore, if the axial width of the connecting portion of the spacer expander can be reduced, it is possible to reduce the axial width of the combined oil ring when the spacer expander is combined with side rails. However, for conventional spacer expanders, wave shapes have been manufactured by gear machining, and thus it has been difficult to reduce the axial width of the connecting portion due to manufacturing reasons. Therefore, there has been a limit in reducing the combined axial width.

In the configuration of a combined oil ring shown in JP04-300467A, the contact portions of the rails and the expander are only the inner peripheral surfaces of the rails and the tapered faces of the expander. Therefore, it is difficult to control the amount of axial movement of the outer peripheral portion of the upper and lower rails in the cylinder. If the amount of movement of the rail outer peripheral surfaces on the cylinder inner peripheral surface is large, vibration tends to occur between the rail outer peripheral surfaces and the cylinder inner peripheral surface.

This may inhibit the reduction of oil consumption by the width reduction, and may cause unusual noises.

In a method that uses a shape steel material as shown in JP05-087240 and JP05-106734A, the steel material itself is expensive in general. Also, the tension of the spacer expander needs to be controlled by the width and number of slits that are formed alternately on the outer peripheral side and the inner peripheral side, and thus, machining process becomes complicated and restricted. In addition, reduction in width and weight is limited due to the thickness and weight of the shape steel material itself.

Therefore, the present invention aims to provide a spacer expander of a combined oil ring with a narrow axial width by simple processes and at a low cost, in which the spacer expander is excellent in followability and stability and effective in improving fuel efficiency of engines.

SUMMARY OF THE INVENTION

The present invention provides a spacer expander of a combined oil ring that comprises a spacer expander and a pair of side rails supported by the spacer expander, and the axial width of the combined oil ring can be reduced. The spacer expander of the present invention is made of a flat strip of metal. Protruding portions in the axial direction of a piston are formed in the inner peripheral portion of the spacer expander as to press side rails outward in the radial direction, outer peripheral portions that are adjacent to the protruding portions in the inner peripheral portion (inner peripheral protruding portions) are cut off, and protruding portions are formed in the outer peripheral portion that are adjacent to the cut off portions (slits) as to support side rails in the axial direction.

The spacer expander of the present invention is characterized in that inner peripheral protruding portions protruding alternately upper and lower in the axial direction are formed on the inner peripheral side interposing connecting portions, and slits are provided on the outer peripheral side of the inner peripheral protruding portions, and the connecting portions extend toward the outer peripheral side. Preferably, upper and lower supporting portions protruding in the axial direction are formed on the outer peripheral side of the connecting portions. In addition, tapered faces are provided on the outer peripheral side of the inner peripheral protruding portions.

A spacer expander of the present invention is made of a metal strip, and a wave-shaped profile in the axial direction of inner peripheral side ear portions (inner peripheral protruding portions) provides tension. Therefore, there is no need to form a wave-shaped profile on the outer peripheral side for controlling tension as in the conventional way. Thus, the combined axial width is equal to the sum of the axial widths of upper and lower side rails and the thickness of the metal strip that forms the spacer expander, or the width of the outer peripheral portion of the spacer expander. Therefore, compared with the case using a spacer expander of a conventional configuration, the axial width of the combined oil ring can be greatly reduced. As a result, a smaller and lighter piston can be obtained, and better fuel efficiency of engines can be realized. In addition, the connecting portion extending toward the outer peripheral side provides an excellent fit and stability. Also, by forming upper and lower supporting portions on the space expander for supporting side rails, a more excellent stability and followability can be obtained.

BRIEF DESCRIPTION OF THE DRAWINGS

For a more complete understanding of the present invention, and the advantages thereof, reference is now made to the following descriptions taken in conjunction with the accompanying drawing, in which.

Figure 1:
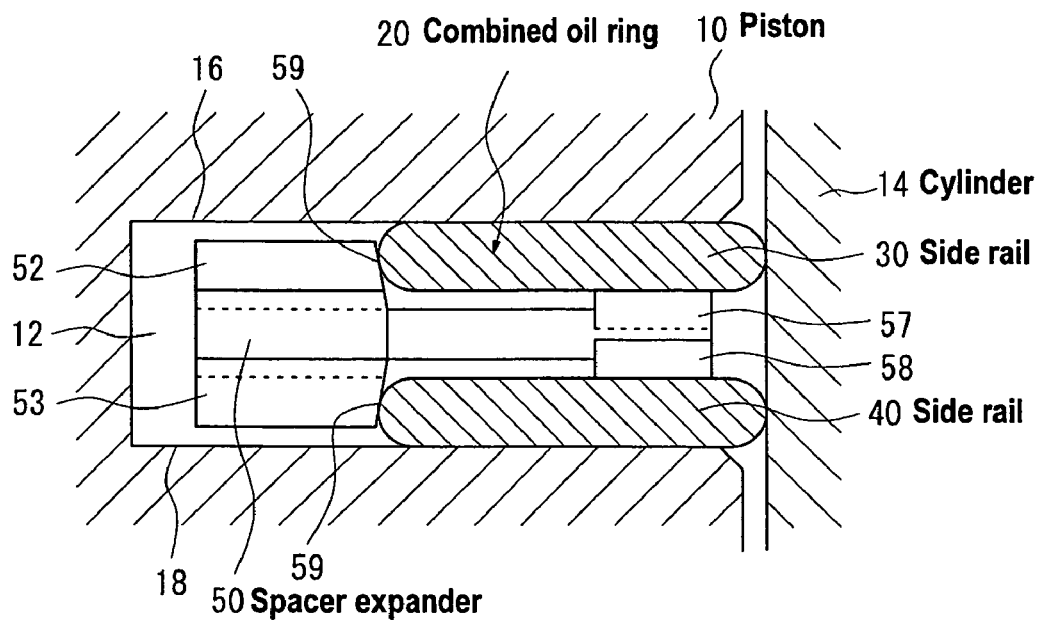
FIG. 1 is a cross sectional view of the configuration of a combined oil ring according to the present invention.

The following list of reference symbols can be used in conjunction with the figures:

10 piston
12 oil ring groove
14 cylinder
16 upper surface
18 lower surface
30, 40 side rails
50 spacer expander
51 inner peripheral protruding portion
52 inner peripheral upper protruding portion
53 inner peripheral lower protruding portion
54 slit
55 connecting portion
56 outer peripheral protruding portion
57 outer peripheral upper protruding portion
58 outer peripheral lower protruding portion
59 tapered face

DETAILED DESCRIPTION OF ILLUSTRATIVE EMBODIMENTS

Referring to the drawings, preferred embodiments for implementing the present invention are described below.

Figure 2:
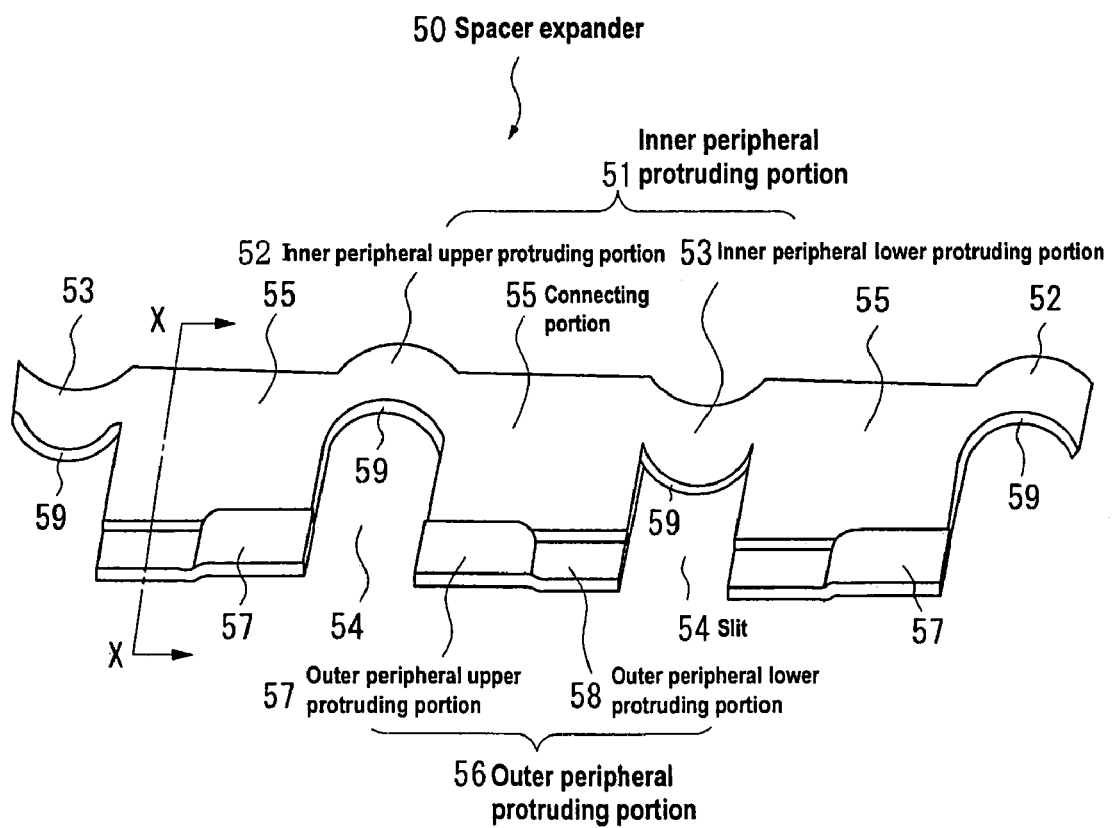
FIG. 2 is an enlarged perspective view of a part of a spacer expander of FIG. 1.
Figure 3:
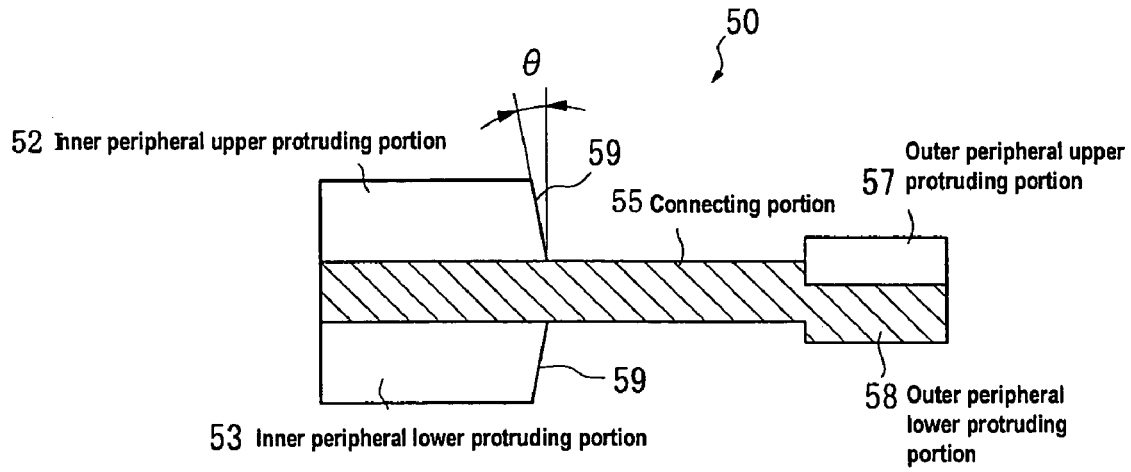
FIG. 3 is a cross sectional view of a spacer expander, taken along line X-X of FIG. 2.

FIG. 1 is a cross sectional view showing a configuration of a three-piece type combined oil ring according to the present invention. FIG. 2 is an enlarged perspective view of a part of a spacer expander. FIG. 3 is a vertical cross sectional view of a spacer expander, taken along line X-X of FIG. 2. In FIG. 1, an oil ring 20 is installed in an oil ring groove 12 of a piston 10 for oil sealing and oil controlling.

When the combined oil ring 20 is installed in the oil ring groove 12 of the piston 10, outer peripheral surfaces of a pair of side rails 30 and 40 contact with the inner peripheral surface of a cylinder 14 at a certain contact pressure.

As shown in FIG. 2, a spacer expander 50 is made of a metal strip and has a plurality of inner peripheral protruding portions 51 that protrude in the axial direction of the piston (hereafter, axial direction) on the inner peripheral side with a certain intervals. An inner peripheral protruding portion 51 is composed of an inner peripheral upper protruding portion 52, and an inner peripheral lower protruding portion 53, wherein protruding portions are arc shaped and protrude upward and downward respectively. These protruding portions 52 and 53 are alternately located in the peripheral direction to form a wave shape (hereafter, inner peripheral wave shape), interposing flat connecting portions 55.

On the outer peripheral side of the inner peripheral upper and lower protruding portions 52 and 53, rectangular slits 54 (space portions) are provided. On the outer peripheral side of the connecting portions 55, outer peripheral protruding portions 56 are formed. An outer peripheral protruding portion 56 is composed of an outer peripheral upper protruding portion 57 and an outer peripheral lower protruding portion 58, wherein each protruding portion protrudes upward or downward in the axial direction from the connecting portion 55. In the example shown in FIG. 2, the outer peripheral upper protruding portions 57 and the outer peripheral lower protruding portions 58 are formed on the outer peripheral side of the connecting portions 55, and the pattern of an upper protruding portion 57 and a lower protruding portion 58 is inverted between adjacent connecting portions 55. Assuming that two adjacent connecting portions 55 are one set or one pair, a plurality set or pair of the connecting portions 55 are located in the peripheral direction. Each of the upper protruding portion 57 and the lower protruding portion 58 has a flat protruding surface, and these surfaces support the side rails.

In the drawing, the connecting portions 55 are flat, and have upper and lower protruding portions (supporting portions) 56 at the end portion of the outer peripheral side, however, the present invention is not limited to such configuration. For example, even if the connecting portions are flat but do not have upper and lower protruding portions, as long as the connecting portions extend toward the outer peripheral side, it becomes easy to set the combined oil ring to the piston, and the stability of the side rails also improves. Moreover, the width in the direction of the combined axis in this case is equal to the sum of the axial widths of upper and lower side rails and the thickness of the metal strip that forms the spacer expander, thus, the width can be greatly reduced. Likewise, the portion in which the upper and lower supporting portions are formed is not limited to the end portion of the outer peripheral side. For example, grooves extending in the radial direction can be formed radially on the connecting portion 55 as to protrude axially upward or downward. The grooves can be formed across all the area radially from the outer peripheral end to the inner peripheral end of the connecting portion 55, or can be formed only in part in the radial direction.

Among the side faces of the inner peripheral upper and lower protruding portions 52 and 53, side faces 59 on the side of the slits, that is, the side faces 59 on the outer peripheral side that contact with side rails, are formed into tapered faces. As shown in FIG. 3, the taper angle θ of the tapered face is the inclination to the perpendicular, and preferably in the range of 10 to 30 degrees. However, in the spacer expander of the present invention, sufficient tension to the outer peripheral side is provided only by the inner peripheral wave shape, thus the side face can be level to the axial direction (θ=0 degree) without being formed into a tapered face.

In the spacer expander 50 of the present invention, tension to the outer peripheral side is provided by the inner peripheral wave shape that is made of the inner peripheral upper and lower protruding portions 52 and 53, and thus the slits 54 have little effect on tension. Therefore, there is no need to control tension by forming slits (space portions) alternately inner and outer peripheral sides as shown in JP05-087240A and JP05-106734A. In the present invention, slits could be formed only on the outer peripheral side, therefore, the machining process can be simplified. Of course, it is possible to form slits on the inner peripheral side also in the spacer expander 50 of the present invention.

Figure 4:
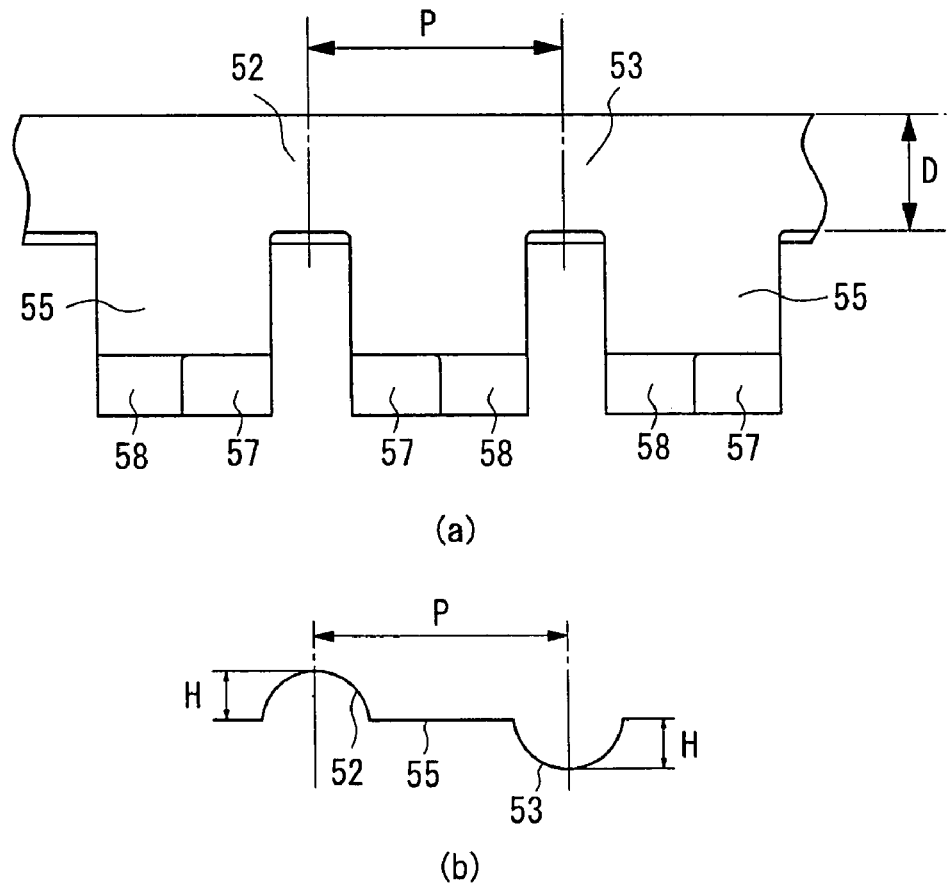
FIG. 4(a) and FIG. 4(b) are a schematic top view and a schematic side view for explaining each part of a spacer expander.

The tension of the spacer expander 50 is controlled especially by (1) the number of pitches in the inner peripheral wave shape, (2) the width of the inner peripheral wave shape in the axial direction, (3) the width of the inner peripheral wave shape in the radial direction, and (4) the thickness of the metal strip. FIG. 4(a) and FIG. 4(b) are a schematic top view and a schematic side view of a spacer expander, and sizes of each part are described with reference to the drawings.

As shown in FIG. 4(a) and FIG. 4(b), pitch width P of the inner peripheral wave shape refers to the width from the center of an inner peripheral upper protruding portion 52 to the center of an adjacent inner peripheral lower protruding portion 53, or from the center of an inner peripheral lower protruding portion 53 to the center of an adjacent inner peripheral upper protruding portion 52. To reduce dispersion of tension in contact pressure, it is preferable that the number of pitches in the inner peripheral wave shape be equal to or more than 50, and more preferably be equal to or more than 70. The pitch width P is set to provide such pitch numbers. In general, the pitch width P is on the order of 2.5 mm to 3.5 mm.

The tension of the spacer expander can be controlled also by the axial width of the inner peripheral wave shape. When the connecting portion 55 is used as a reference and measured from the connecting portion 55, the axial width of the inner peripheral wave shape is the width (height) H to the maximum value in the axial direction of the inner peripheral upper protruding portion 52 or lower protruding portion 53. To provide tension, it is desirable that the axial width of the inner peripheral wave shape H be made large. However, it should be noted that, in the state the combined oil ring 20 is installed in the ring groove 12, the upper and lower surfaces of the side rails 30 and 40 should protrude beyond the protruding surfaces of the inner peripheral wave shape as shown in FIG. 1.

The tension of the spacer expander can be controlled also by the width D of the inner peripheral wave shape in the radial direction. The radial width D of the inner peripheral wave shape can be designed as appropriate by the radial width of the side rail and by the radial width of the ring groove 12 of the piston.

To obtain optimal tension, it is desirable that the thickness of the metal strip that forms the spacer expander be in the range of 0.10 mm to 0.25 mm. The thickness below 0.1 mm may cause problems in strength of the spacer expander. With the thickness over 0.25 mm, it becomes difficult for the spacer expander to provide sufficient tension.

Figure 6:
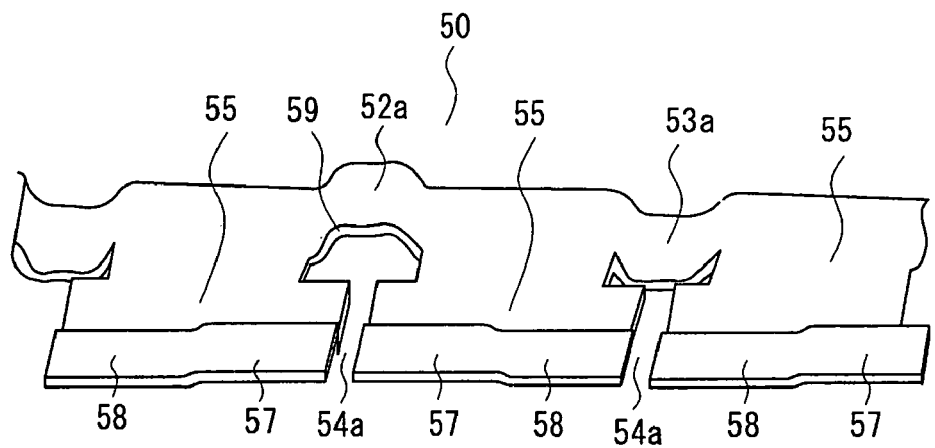
FIG. 6 is a modified example of a spacer expander according to the present invention.
Figure 7:
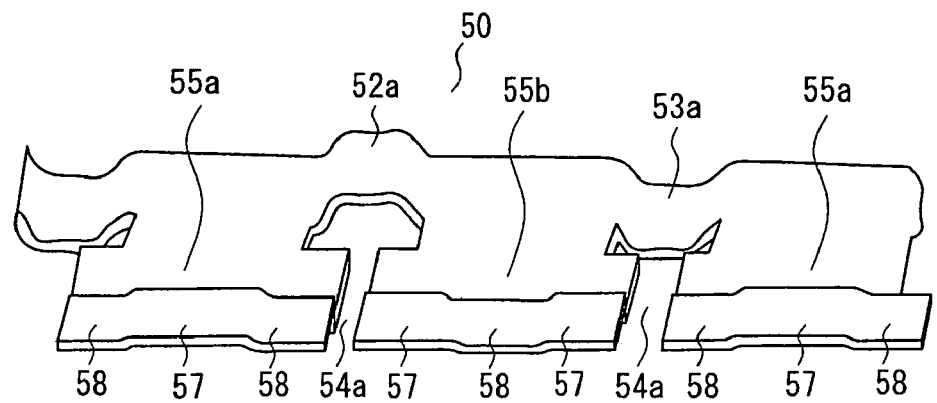
FIG. 7 is another modified example of a spacer expander according to the present invention.

In the spacer expander 50 of the present example, as shown in FIG. 2, the profile of the protruding surfaces of the upper and lower protruding portions 52 and 53 of inner peripheral wave shape is an arc-shape (round profile), however, the profile is not limited to such a shape. The profile can be a mesa profile as shown in FIG. 6 and FIG. 7, or it can be a protruding portion having, for example, a triangular or rectangular shape, considering relationships with side rails, i.e., wear, stress occurrence, or the like.

Referring back to FIG. 1, when the oil ring 20 in which two side rails 30 and 40 are combined by using the spacer expander 50 is installed in the ring groove 12, the side rails 30 and 40 are located, respectively, on the side of the upper surface 16 and on the side of the lower surface 18 of the ring groove 12. The inner peripheral surfaces of the side rails 30 and 40 contact with the tapered faces 59 of the inner peripheral protruding portions 52 and 53 of the spacer expander 50, and the inner peripheral surfaces are pressed outward in the radial direction and in the axial direction depending on the taper angle θ. Concurrently, the outer peripheral protruding portions 57 and 58 of the spacer expander 50 contact with the side rails 30 and 40, and thus the side rails 30 and 40 are supported in the axial direction. In this way, side rails 30 and 40 can perform oil scraping of the inner peripheral surface of the cylinder 14, and sealing on the upper and lower surfaces 16 and 18 of the oil ring groove 12.

Figure 5:
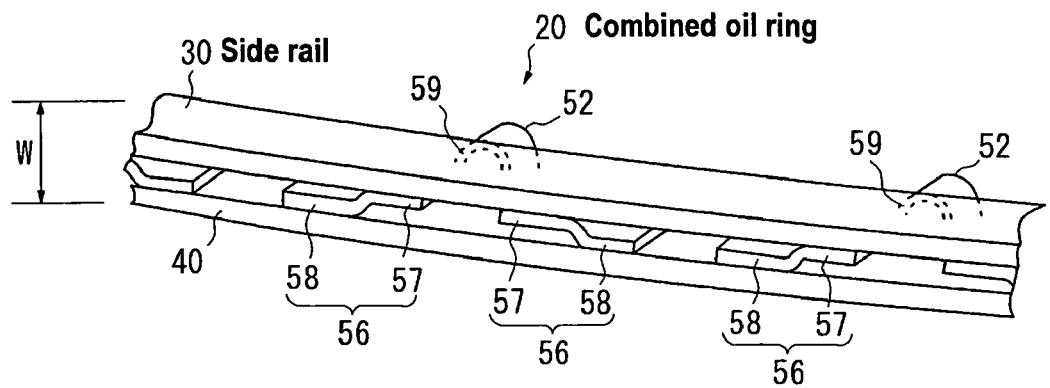
FIG. 5 is a perspective view when the spacer expander is combined with side rails.

FIG. 5 shows a perspective view when a spacer expander 50 is combined with side rails. The width W of the combined oil ring in the axial direction is the sum of the protruding height of the outer peripheral protruding portion 56 (the height from the top end of the upper protruding portion 57 to the bottom end of the lower protruding portion 58) and the axial widths of side rails 30 and 40 (for two side rails). Therefore, the width of the combined oil ring in the axial direction can be greatly reduced.

The axial width W of the combined oil ring 20 is decided by the protruding height of the outer peripheral protruding portion 56. It is preferable that the protruding height of the outer peripheral protruding portion 56 be in the range of 20 micrometers to 120 micrometers. This is because if the height is below 20 micrometers, oil-flow path becomes too narrow, which tends to cause sticking. With the height over 120 micrometers, the amount of movement of the rails in the axial direction becomes large, which tends to cause noises.

As described above, because the tension of the spacer expander 50 is controlled by its inner peripheral wave shape, the profile and size of the slits 54 (space portions) on the outer peripheral side can be designed only with viewpoints of strength, light-weighing, or the like, and thus greater design flexibility can be obtained. Although the profile of the slits 54 of the spacer expander shown in FIG. 2 is rectangular, shapes other than rectangular can be adopted. For example, as shown in FIG. 6 and FIG. 7, the profile of the slits 54a can be a substantially T-shaped so that the width of the slits in the peripheral direction on the inner peripheral side is wide and the width in the peripheral direction on the outer peripheral side is narrow. By adopting such shapes, the spacer expander can be made lighter, while securing the contact area with side rails on the outer peripheral side, and obtaining stable sealing capability by controlling the movement of the side rails in the axial direction.

In addition, in the example shown in FIG. 2, a pair of an outer peripheral upper protruding portion 57 and an outer peripheral lower protruding portion 58 is formed on the outer peripheral end portion of the connecting portion 55, but it is not necessarily limited to such an arrangement. For example, as shown in FIG. 7, an upper protruding portion 57 and, on both sides thereof, two lower protruding portions 58 are formed on the outer peripheral end portion of a connecting portion 55a, and a lower protruding portion 58 and, on both sides thereof, two upper protruding portions 57 are formed on the outer peripheral end portion of a connecting portion 55b that is adjacent to the connecting portion 55a. Then a plurality of pairs of such connecting portions 55a and 55b can be located in the peripheral direction.

Although it is desirable that the profile of the outer peripheral protruding portions 57 and 58 be flat to secure the contact area with side rails, it is possible to use other shapes, such as a curved shape.

Now, the performance of a combined oil ring using the spacer expander according to the present invention is compared with the one using a conventional spacer expander.

As a comparison sample, a conventional spacer expander whose outer peripheral side connecting portion was formed into a wave shape by gear machining was formed by using a metal strip having a thickness of 0.2 mm. In this spacer expander, pitch width was 2.5 mm, the number of pitches was 91, axial width was 2.0 mm, and radial width was 2.2 mm. This spacer expander was combined with two side rails having a radial length of 1.93 mm and an axial width of 0.3 mm. The combined oil ring obtained by this combination had a tension of 10 N, a ring nominal diameter of 75.0 mm, a combined radial length of 2.55 mm, and a combined axial width of 2.0 mm.

As an example, a spacer expander shown in FIG. 2 was formed by using a metal strip having a thickness of 0.2 mm. In this example, pitch width was 3.0 mm, number of pitches was 78, axial width was 0.89 mm, and radial width was 2.45 mm. This spacer expander was combined with two rails similar to those of the comparison sample. Obtained combined oil ring had a tension of 10 N, a ring nominal diameter of 75.0 mm, a combined radial length of 2.55 mm, and a combined axial width of 1.0 mm.

Engine performance tests were performed by using the combined oil rings of the comparison sample and example. In the tests, a 1988 cc in-line four-cylinder gasoline engine was operated for 100 hours at 6000 rpm at full load, with a water temperature (at outlet) of 90 degrees centigrade, and an oil temperature of 100 degrees centigrade.

Figure 8:
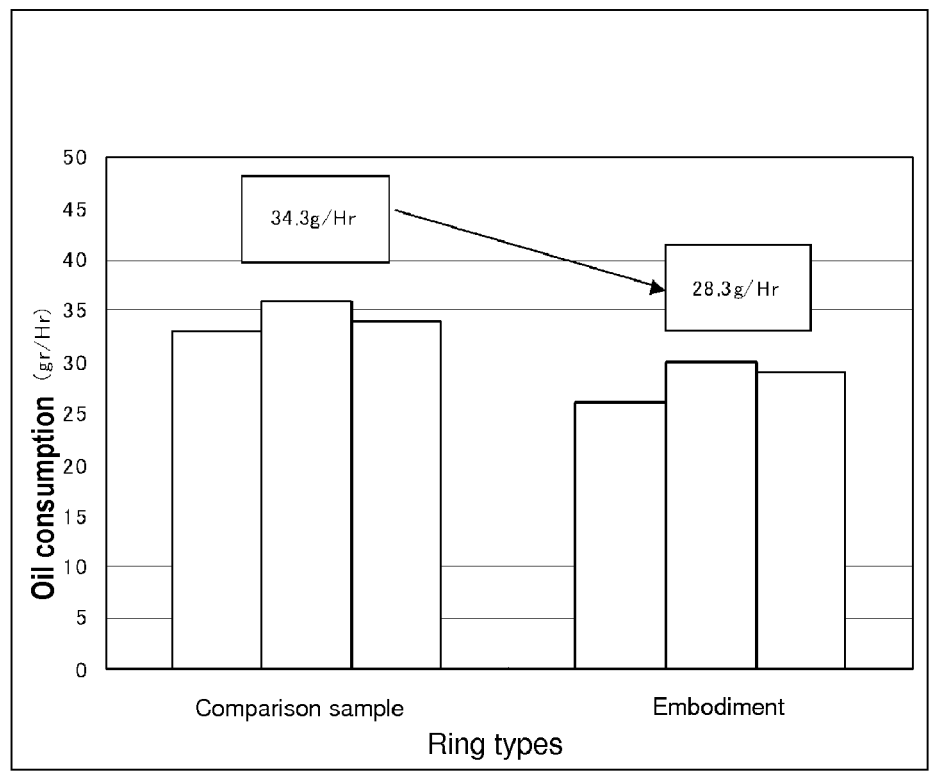
FIG. 8 is a graph showing comparison in oil consumption tests.
Figure 9:
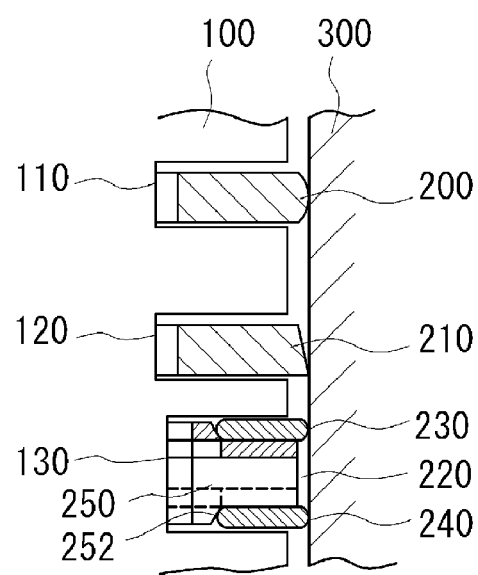
FIG. 9 is a cross sectional view showing an example of a conventional oil ring.

FIG. 8 shows the amount of oil consumption after the engine operation was completed. When the spacer expander of the example was used, the average value of three measurements was 28.3 g/Hr. This is a 17.5% reduction compared to the case where the spacer expander of the comparison sample was used, with the average value of three measurements being 34.3 g/Hr. In addition, noise occurrence due to vibration between the rail outer peripheral surfaces and the cylinder inner peripheral surface was not occurred also in the case where the combined oil ring of the example was used, as same as in the comparison sample.

Although preferred embodiments of the present invention have been described in detail, the present invention is not limited to such specific embodiments, and various changes and alterations can be made herein without departing from the spirit and scope of the invention as defined by the appended claims.

According to the present invention, the width in the axial direction of a combined oil ring can be reduced while maintaining a stable followability. As a result, a smaller and lighter piston can be realized, and a combined oil ring for internal combustion engines having better fuel efficiency can be provided.

What is claimed is:

1. A spacer expander, characterized in that inner peripheral protruding portions protruding alternately upper and lower in an axial direction are formed interposing a connecting portion on an inner peripheral side, wherein slits are provided on an outer peripheral side of said inner peripheral protruding portions, and said connecting portion is extending toward the outer peripheral side, wherein the inner peripheral protruding portions and the connecting portion are each formed from a metal strip and wherein the metal strip has a thickness in the range of 0.10 mm to 0.25 mm.

2. The spacer expander of claim 1, characterized in that upper and lower supporting portions protruding in the axial direction are formed on the outer peripheral side of said connecting portion.

3. The spacer expander of claim 2, characterized in that tapered faces are provided on the outer peripheral side of said inner peripheral protruding portions.

4. The spacer expander of claim 1, characterized in that tapered faces are provided on the outer peripheral side of said inner peripheral protruding portions.

5. A spacer expander comprising:
   a first inner peripheral protruding portion protruding upward in an axial direction;
   a second inner peripheral protruding portion protruding downward in the axial direction;
   a connecting portion disposed between the first inner peripheral protruding portion and the second inner peripheral, said connecting portion extending toward an outer peripheral side;
   a first slit disposed on said outer peripheral side of the first inner peripheral protruding portion; and
   a second slit disposed on said outer peripheral side of the second inner peripheral protruding portion;
   wherein the first inner peripheral protruding portion, the second inner peripheral protruding portion, and the connecting portion are all formed from a metal strip; and
   wherein the metal strip has a thickness in the range of 0.10 mm to 0.25 mm.

6. The spacer expander of claim 5, further comprising upper and lower supporting portions disposed on the outer peripheral side of said connecting portion.

7. The spacer expander of claim 5, wherein the outer peripheral side of said inner peripheral protruding portions includes tapered faces.

8. The spacer expander of claim 5, further comprising:
   a third inner peripheral protruding portion protruding upward in the axial direction;
   a fourth inner peripheral protruding portion protruding downward in the axial direction;
   a second connecting portion disposed between the second inner peripheral protruding portion and the third inner peripheral protruding portion; and
   a third connecting portion disposed between the first inner peripheral protruding portion and the fourth inner peripheral protruding portion.

9. The spacer expander of claim 8, wherein first inner peripheral protruding portion, the second inner peripheral protruding portion, the third inner peripheral protruding portion, the fourth inner peripheral protruding portion, the connecting portion, the second connecting portion, and the third connecting portion are all formed from a metal strip.

10. An apparatus comprising:
    a piston;
    an oil ring installed in an oil ring groove of the piston, the oil ring including a pair of side rails in contact with an inner surface of the oil ring groove; and
    a space expander disposed within the oil ring groove and in contact with the side rails of the oil ring, the space expander characterized in that inner peripheral protruding portions protruding alternately upward and downward in an axial direction are formed between a connecting portion on an inner peripheral side, wherein slits are provided on an outer peripheral side of said inner peripheral protruding portions, and said connecting portion extends toward the outer peripheral side, wherein the spacer expander is formed of a metal strip and wherein the metal strip has a thickness in the range of 0.10 mm to 0.25 mm.

11. The spacer expander of claim 10, characterized in that upper and lower supporting portions protruding in the axial direction are formed on the outer peripheral side of said connecting portion.

12. The spacer expander of claim 11, characterized in that tapered faces are provided on the outer peripheral side of said inner peripheral protruding portions.

13. The spacer expander of claim 10, characterized in that tapered faces are provided on the outer peripheral side of said inner peripheral protruding portions.

* * * * *